(12) United States Patent
Yoshimura

(10) Patent No.: US 7,393,888 B2
(45) Date of Patent: Jul. 1, 2008

(54) AQUEOUS FLAME RETARDANT RESIN COMPOSITION

(75) Inventor: Nobuyoshi Yoshimura, Ogaki (JP)

(73) Assignee: The Nippon Synthetic Chemical Industry Co., Ltd., Osaka-shi (JP)

( * ) Notice: Subject to any disclaimer, the term of this patent is extended or adjusted under 35 U.S.C. 154(b) by 0 days.

(21) Appl. No.: 11/473,161

(22) Filed: Jun. 23, 2006

(65) Prior Publication Data

US 2006/0241229 A1    Oct. 26, 2006

Related U.S. Application Data

(63) Continuation of application No. PCT/JP2004/019021, filed on Dec. 20, 2004.

(30) Foreign Application Priority Data

Dec. 25, 2003   (JP)   .............................. 2003-429287

(51) Int. Cl.
*C08K 3/32* (2006.01)

(52) U.S. Cl. .................................... 524/416

(58) Field of Classification Search ................. 524/416; 424/416
See application file for complete search history.

(56) References Cited

U.S. PATENT DOCUMENTS

| 3,901,976 | A | * | 8/1975 | Roth et al. | ..................... 426/69 |
| 6,248,820 | B1 | | 6/2001 | Nozaki et al. | |
| 6,759,463 | B2 | * | 7/2004 | Lorah et al. | ................. 524/445 |
| 2005/0277711 | A1 | * | 12/2005 | Takahata et al. | ............ 523/210 |
| 2006/0235131 | A1 | * | 10/2006 | Hughes et al. | .............. 524/460 |

FOREIGN PATENT DOCUMENTS

| JP | 02-258682 | 10/1990 |
| JP | 09-087470 | 3/1997 |
| JP | 2003-171878 | 6/2003 |

* cited by examiner

*Primary Examiner*—Peter Szekely
(74) *Attorney, Agent, or Firm*—Antonelli, Terry, Stout & Kraus, LLP.

(57) ABSTRACT

The aqueous resin composition comprises components (A) and (B), wherein (A) is a synthetic resin emulsion prepared by emulsion-polymerizing a radical-polymerizable unsaturated monomer using a surfactant having at least one polymerizable unsaturated bond, and (B) is a polyphosphate salt.

To provide an aqueous flame retardant resin composition which is excellent in flame retardancy and storage stability, and is less likely to produce a fogging phenomenon.

9 Claims, No Drawings

AQUEOUS FLAME RETARDANT RESIN COMPOSITION

REFERENCE TO RELATED APPLICATION

This application is filed under 35 U.S.C. § 111(a) and § 120 as a continuation of International Application No. PCT/JP2004/019021 filed Dec. 20, 2004, which claims priority under 35 U.S.C. § 119 of Japanese Patent Application No. 2003-429287 filed Dec. 25, 2003, and the whole disclosure of these prior applications is herein incorporated by reference.

TECHNICAL FIELD

The present invention relates to an aqueous resin composition. More specifically, the present invention relates to an aqueous flame retardant resin emulsion composition which can be suitably used for a backing agent, an adhesive agent, a coating agent and the like, which have flame retardancy.

BACKGROUND ART

A technique of adding a flame retardant to a synthetic resin emulsion to impart flame retardancy has conventionally been employed for the purpose of imparting flame retardancy to a backing agent of a carpet, an adhesive agent, a coating agent and the like. Halogenated compounds such as brominated compounds having high flame retardant effect, or a mixture of the halogenated compound and antimony oxide are generally adopted as a flame retardant. For example, nuclear bromine-substituted aromatic compounds such as a decabromodiphenyl ether and tetrabromobisphenol A are known as a brominated compound as a flame retardant.

The problem, however, is that these halogenated compounds cause gas harmful to a human body by thermal decomposition, or are harmful to natural environments. Thus, a process for flame-retarding a backing agent and the like without using the halogenated compounds is desired.

Inorganic flame retardants, for example, a polyphosphate salt such as ammonium polyphosphate are studied as a flame retardant in place of such halogen flame retardants (for example, Patent Reference 1 (JP-A-9-310283) and Patent Reference 2 (JP-A-2001-31824)).

However, the addition of polyphosphate salt flame retardants to a synthetic resin emulsion occasionally causes a protective layer of the synthetic resin emulsion to be broken by hydrolysis of polyphosphate salt and thickened with time. In order to avoid such a problem, generally, special dispersant and resin are previously used for para-encapsulating polyphosphate before adding polyphosphate salt to a synthetic resin emulsion or adding polyphosphate salt to a synthetic resin emulsion after encapsulating polyphosphate salt. Thus, the stability of polyphosphate salt can be improved; however, the emulsion to which polyphosphoric acid is added in this manner is occasionally restricted in formulation. By adopting such a technique, the problem of storage stability is not solved, and harmful components are diffused from the encapsulated resin with time. Further, flame retardant performance of a polyphosphate salt may happen to be lowered. In addition, encapsulation leads to a rise in manufacturing costs thereof.

Large amount of dispersants are generally used for stably dispersing polyphosphate salt flame retardants in a synthetic resin emulsion. A surfactant is generally used as a dispersant, and when a surfactant freely exists in the emulsion, a part of the surfactant is decomposed, which may cause a phenomenon such that a decomposed article thereof (such as a nonylphenyl ether) is released into the air with time. Such a phenomenon is called "a fogging phenomenon", and most of the decomposed article released into the air is harmful to a human body and environments. Thus, it is desired that the fogging phenomenon be restrained as much as possible from occurring.

Patent Reference 1: JP-A-9-310283
Patent Reference 2: JP-A-2001-31824

DISCLOSURE OF INVENTION

The inventors of the present invention recently found out that the stability of a polyphosphate salt can be improved by using a synthetic resin emulsion obtained by emulsion-polymerizing a monomer with the use of a particular surfactant having at least one polymerizable unsaturated bond as a synthetic resin emulsion to be used, without performing an encapsulation treatment on the polyphosphate salt, in the case of obtaining an aqueous flame retardant resin composition prepared by adding an inorganic flame retardants comprising a polyphosphate salt to the synthetic resin emulsion. Thus, the obtained aqueous resin composition is excellent in stability of viscosity with time and storage stability, and is less likely to produce a fogging phenomenon. The present invention is based on these findings.

Therefore, an object of the present invention is to provide an aqueous flame retardant resin composition, which is excellent in flame retardancy and storage stability, and is less likely to produce a fogging phenomenon, without using a halogen flame retardant harmful to a human body and natural environments.

The aqueous resin composition according to the present invention comprises the following components (A) and (B):

(A) a synthetic resin emulsion prepared by emulsion-polymerizing a radical-polymerizable unsaturated monomer by using a surfactant having at least one polymerizable unsaturated bond, and (B) polyphosphate salt.

The process for preparing the aqueous resin composition according to the present invention comprises adding a polyphosphate salt to a synthetic resin emulsion obtained by emulsion-polymerizing a radical-polymerizable unsaturated monomer by using a surfactant having at least one polymerizable unsaturated bond.

According to another embodiment of the present invention, a flame retardant composition comprising the aqueous resin composition according to the present invention is provided.

According to a further embodiment of the present invention, a process for flame-retarding a resin composition comprising compounding the flame retardant composition according to the present invention to a precursor composition of the resin composition is provided.

The aqueous resin composition according to the present invention is prepared by using a polyphosphate salt as a flame retardant without using halogen flame retardants harmful to a human body and natural environments. Thus, the composition according to the present invention can be expected to improve water resistance by adding a polyphosphate salt. The resin composition according to the present invention is excellent in stability with time by using a particular synthetic resin emulsion, and is scarcely thickened and separated. The resin composition according to the present invention is excellent in flame retardancy and storage stability, and is less likely to produce a fogging phenomenon. Therefore, the resin composition according to the present invention can be favorably used for a backing agent, an adhesive agent, a binder, a coating agent and the like, which are required to be flame retardant.

BEST MODE FOR CARRYING OUT THE INVENTION

Aqueous Resin Composition

An aqueous resin composition according to the present invention comprises (A) a synthetic resin emulsion prepared by emulsion-polymerizing a radical-polymerizable unsaturated monomer by using a surfactant having at least one polymerizable unsaturated bond, and (B) a polyphosphate salt. The aqueous resin composition according to the present invention has flame retardancy. Herein, flame retardancy refers that a resin composition itself containing a flame retardant or a compound comprising the resin composition has such properties as to be hardly or not burned under contacting with flame, or to hardly continue to be burned in flames even in the case of being ignited.

(A) Synthetic Resin Emulsion

In the present invention, a synthetic resin emulsion of a component (A) is prepared by emulsion-polymerizing a radical-polymerizable unsaturated monomer by using a surfactant having at least one polymerizable unsaturated bond.

Radical-Polymerizable Unsaturated Monomer

The radical-polymerizable unsaturated monomer may be any one as long as it has a radical-polymerizable unsaturated group and can be used for emulsion polymerization. Examples of such a monomer are monomers containing a carboxyl group or an anhydride group thereof, a hydroxyl group-containing monomer, a vinyl ester, an aromatic vinyl compound and olefin.

Examples of the monomers containing a carboxyl group or an anhydride group thereof are an alkyl (meth)acrylate ester or a cycloalkyl (meth)acrylate ester having an alkyl group with a carbon number of 1 to 18, and unsaturated carboxylic acid or anhydride thereof. Herein, the alkyl group with a carbon number of 1 to 18 may be any of in the state of a straight chain, a branched chain, or a ring, examples thereof are methyl, ethyl, n-butyl, t-butyl, propyl, 2-ethylhexyl and octyl. Specific examples of the alkyl (meth)acrylate ester are methyl methacrylate, ethyl acrylate, butyl acrylate and 2-ethylhexyl acrylate. Examples of the cycloalkyl (meth)acrylate ester are cyclohexyl acrylate and cyclohexyl methacrylate. Examples of unsaturated carboxylic acid or anhydride thereof are acrylic acid, methacrylic acid, itaconic acid, crotonic acid, maleic acid and maleic anhydride.

In the present specification, "(meth)acrylic" indicates acrylic or methacrylic.

Examples of a hydroxyl group-containing monomer are hydroxy methacrylate, 2-hydroxyethyl (meth)acrylate and 2-hydroxypropyl (meth)acrylate.

Examples of the vinyl ester are (meth)acrylamide, acrylonitrile, vinyl acetate, vinyl propionate, a vinyl ester of branched carboxylic acid, vinyl versatate and vinyl laurate.

Examples of olefin are ethylene and propylene.

Examples of aromatic vinyl compounds are styrene and α-methyl styrene.

These radical-polymerizable unsaturated monomers are preferably used in combination of at least two kinds thereof.

According to a preferable embodiment of the present invention, a radical-polymerizable unsaturated monomer is at least one selected from the group consisting of an alkyl (meth) acrylate ester, unsaturated carboxylic acid, a vinyl ester and an aromatic vinyl compound.

In the present invention, monomers having a crosslinkable functional group in addition to the above-mentioned copolymerizable monomers can be further used as a radical-polymerizable unsaturated monomer used for obtaining the synthetic resin emulsion. Specific examples of such monomers having a crosslinkable functional group are amide group-containing monomers such as acrylamide, methacrylamide, N-methylol(meth)acrylamide, N-methoxymethyl (meth) acrylamide, N-butoxymethyl (meth)acrylamide and diacetone (meth)acrylamide; amino group-containing monomers such as dimethylaminoethyl (meth)acrylate and diethylaminoethyl (meth)acrylate; alkoxyl group-containing monomers such as methoxyethyl (meth)acrylate and butoxyethyl (meth) acrylate; glycidyl group-containing monomers such as glycidyl acrylate, glycidyl methacrylate and a glycidyl allyl ether; monomers having at least two ethylenically unsaturated groups in one molecule such as divinylbenzene, allyl (meth)acrylate, ethylene glycol di(meth)acrylate, diethylene glycol di(meth)acrylate and trimethylolpropane tri(meth) acrylate; and silane monomers having a hydrolyzable alkoxy group such as vinyltrimethoxysilane, vinyltriethoxysilane and acryloxytrimethoxysilane. These monomers may be used together in two kinds or more.

According to a preferable embodiment of the present invention, a radical-polymerizable unsaturated monomer further comprises a monomer having a crosslinkable functional group.

In the case of using a radical-polymerizable unsaturated monomers in combination of at least two kinds thereof, examples of a preferable combination of the radical-polymerizable unsaturated monomers are a combination of alkyl (meth)acrylate ester/unsaturated carboxylic acid, a combination of alkyl (meth)acrylate ester/styrene/unsaturated carboxylic acid, a combination of styrene/unsaturated carboxylic acid, and a combination of alkyl (meth)acrylate ester/vinyl ester/unsaturated carboxylic acid.

According to a more preferable embodiment of the present invention, a combination of the monomers used for obtaining a synthetic resin emulsion is such that monomers having a crosslinkable functional group are further added to these combinations of the monomers. The use of such a combination allows water resistance, heat resistance and solvent resistance of the obtained synthetic resin emulsion and resin composition to be further improved.

In the case of using a monomers having crosslinkable functional group, the monomer having a crosslinkable functional group are preferably contained by 0.1 to 20% by weight, and more preferably 0.3 to 10% by weight based on the total amount of the monomer. It is advantageous that the monomer having a crosslinkable functional group are contained in the whole monomer within the above-mentioned ranges since heat resistance of a resin composition according to the present invention is improved.

Surfactant Having at Least One Polymerizable Unsaturated Bond

A surfactant having at least one polymerizable unsaturated bond (hereinafter, referred to as a polymerizable surfactant) to be used in the present invention is not particularly limited as long as it can be usable for publicly-known emulsion polymerization, and any of anionicity, cationicity, and non-ionicity is usable regardless of ionicity thereof. Such a surfactant having at least one radical-polymerizable unsaturated bond can be suitably selected from publicly-known substances. A polymerizable surfactant may be used in a combination of at least two kinds.

Examples of the polymerizable surfactant are compounds 1) to 15) shown in the following.

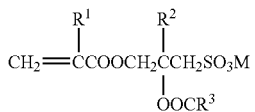
1)

$R^1$, $R^2$: H, $CH_3$
$R^3$: alkyl of $C_{7-21}$, alkenyl group
M: alkali metal, ammonium group
(see JP-A-54-144317)

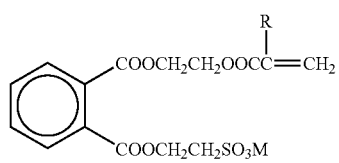
2)

R: H, $CH_3$
M: alkali metal, ammonium group, amine
(see JP-A-55-115419)

3)

R: H, $CH_3$
A: alkylene group
n: an integer of at least 2
M: monovalent or divalent cation
(see JP-A-62-34947)

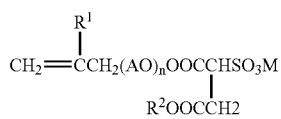
4)

$R^1$: H, $CH_3$
$R^2$: unsubstituted or substituted hydrocarbon group etc.
A: alkylene group of $C_{2-4}$ and substituted alkylene group
n: 0, positive number
(see JP-B-49-46291)

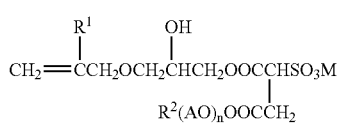
5)

$R^1$: H, $CH_3$
$R^2$: unsubstituted or substituted hydrocarbon group, amino group etc.

A: alkylene group of $C_{2-4}$
n: 0 to 100
M: monovalent or divalent cation
(see JP-A-58-203960)

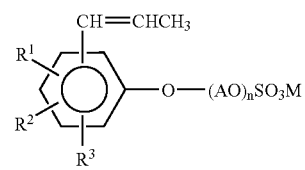
6)

$R^1$: alkyl group of $C_{6-18}$ etc.
$R^2$: H, alkyl group of $C_{6-18}$ etc.
$R^3$: H, propenyl group
A: alkylene group of $C_{2-4}$ and substituted alkylene group
M: alkali metal etc.
n: 1 to 200
(see JP-A-4-53802)

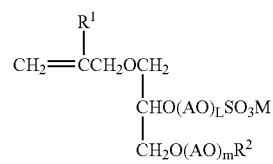
7)

$R^1$: H, $CH_3$
$R^2$: hydrocarbon group of $C_{8-24}$ etc.
A: alkylene group of $C_{2-4}$
M: H, alkali metal, alkaline earth metal, ammonium group etc.
L: 0 to 20
m: 0 to 50
(see JP-A-62-104802)

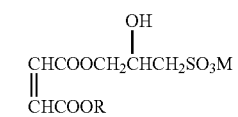
8)

R: hydrocarbon group of $C_{8-22}$
M: alkali metal, ammonium group
(see JP-A-49-40388)

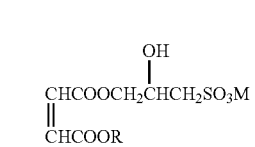
9)

R: hydrocarbon group of $C_{8-22}$
M: alkali metal, ammonium group
(see JP-A-49-40388)

10)

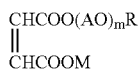

R: alkyl, alkylphenyl
A: ethylene
M: ammonium, amine, alkali metal
m: 9, 12, 14, 28 (Examples)
(see JP-A-52-134658)

11)

$R^1$: H, $CH_3$
$R^2$: H, $CH_3$, $-C_6H_4-(CH_2)_m-H$
n: 4 to 30
(see JP-A-53-126093)

12)

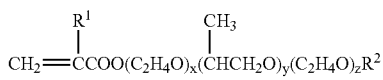

$R^1$, $R^2$: H, $CH_3$
x: 0 to 100
y: 0 to 100
z: 0 to 100

$1 \leq x+y+z \leq 100$ (see JP-A-56-28208)

13)

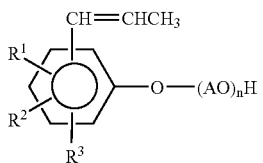

$R^1$: alkyl group of $C_{6-18}$ etc.
$R^2$: H, alkyl group of $C_{6-18}$ etc.
$R^3$: H, propenyl group
A: alkylene group of $C_{2-4}$ and substituted alkylene group
n: 1 to 200
(see JP-A-4-50204)

14)

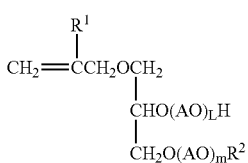

$R^1$: H, $CH_3$
$R^2$: hydrocarbon group of $C_{8-24}$, acyl group
A: alkylene group of $C_{2-4}$
L: 0 to 100 m: 0 to 50
(see JP-A-62-104802)

15)

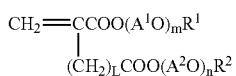

$R^1$, $R^2$: H, hydrocarbon group of $C_{1-20}$, acyl group
$A^1$, $A^2$: alkylene group of $C_{2-4}$ and substituted alkylene group
L: 1, 2
m, n: 0, positive number, $m+n \geq 3$
in the case where both $R^1$ and $R^2$ are H, m, $n \geq 1$
(see JP-A-50-98484)

Specific examples of a polymerizable surfactant are ammonium =α-sulfonate-ω-1-(allyloxymethyl)alkyloxy-polyoxyethylene, ammonium salt of α-sulfo-ω-(1-(alkoxy) methyl-2-(2-propenyloxy)ethoxy-poly(oxy-1,2-etha nediyl) and a polyoxyethylenealkylpropenylphenyl ether.

In the present invention, a general surfactant having no radical-polymerizable unsaturated bond (hereinafter, referred to as a non-polymerizable surfactant) may be used if necessary, in addition to the polymerizable surfactant. Examples of such a non-polymerizable surfactant are anionic emulsifiers such as alkyl or alkylallyl sulfate, alkyl or alkylallyl sulfonate and dialkyl sulfosuccinate; cationic emulsifiers such as alkyltrimethylammonium chloride and alkylbenzylammonium chloride; and nonionic emulsifiers such as polyoxyethylenealkylphenyl ether, polyoxyethylenealkyl ether and polyoxyethylene carboxylate.

Specific examples of the non-polymerizable surfactant are sodium dodecylbenzenesulfonate, sodium polyoxyethylene-alkyl ether sulfate and sodium alkylsulfonate as the anionic type, and polyoxyethylenealkyl-type, polyoxyethylenealkyl ether-type, polyoxyethylene glycol-type and polyoxyethyl-enepropylene glycol-type as the nonionic type.

The amount of surfactants used in the present invention is preferably 0.3 to 10 parts by weight, and more preferably 1.0 to 8.0 parts by weight, calculated by weight the total amount of the monomers and the total amount of the components charged in a polymerization vessel.

In the case of using a non-polymerizable surfactant in addition to the polymerizable surfactant, the amount of the polymerizable surfactant is preferably 60 to 100% by weight based on the total amount of the surfactant. When the amount of the surfactant is at least 60% by weight, storage stability of the resin composition according to the present invention can be further improved.

Preparation of Synthetic Resin Emulsion

A synthetic resin emulsion of the component (A) can be obtained by polymerizing a radical-polymerizable unsaturated monomer in accordance with a publicly-known emulsion polymerization method by using the above-described polymerizable surfactants. Accordingly, the monomers to be used are mixed in a polymerization vessel, to which the surfactant and, as required, an auxiliary component such as a polymerization initiator are added and subject to emulsion polymerization in a water system, thereby a polymerization reaction can be carried out. In this case, components such as the monomers and the surfactant may be polymerized by charging together into the polymerization vessel at once, or may be polymerized while continuously supplying each of the components, either of the methods can be applied. A polymerization reaction may be performed after previously mixing and dispersing the monomers and the surfactant into water to prepare a pre-emulsion. Such a process is preferable in view of stability of a polymerization reaction. In addition, in the case of polymerizing while continuously supplying the components, the composition of each of the components to be supplied may be changed for a multistage polymerization reaction.

Examples of a polymerization initiator are persulfates such as potassium persulfate and ammonium persulfate, water-soluble polymerization initiators such as hydrogen peroxide solution, t-butyl hydroperoxide and dihydrochloride of 2,2'-azobis-2-methyl-propanimidoamide, and oil-soluble type of polymerization initiators such as benzoyl peroxide, cumene hydroperoxide, dibutyl peroxide, diisopropyl peroxydicarbonate, cumyl peroxyneodecanoate, cumyl peroxyoctoate and azobisisobutyronitrile. In addition, as required, a redox polymerization initiator using together reducing agents such as acidic sodium sulfite, Rongalite, L-ascorbic acid, saccharides and amines can be used in the present invention.

A used amount of the polymerization initiator can be 0.01 to 3 parts by weight based on 100 parts by weight of the total amount of the monomers.

In the present invention, a polymerization reaction is performed while stirred under the temperature condition of generally 35 to 90° C., and reaction time is generally approximately 3 to 40 hours.

Other auxiliary components may be further used in emulsion polymerization in the present invention. Examples of such other auxiliary components are publicly known additives such as a pH adjustor, a chain transfer agent, a surface tension depressant, a coalescing agent, an MFT adjustor, an aqueous medium, a thickener, an antifreezing agent, an antifoaming agent, and an antiseptic agent. Other auxiliary components can be suitably selected in accordance with the object.

For example, at starting or after terminating emulsion polymerization, a basic substance is added as a pH adjustor to a synthetic resin emulsion to be capable of adjusting the pH. Such adjustment of pH allows preservation stability, freezing stability and chemical stability of the emulsion to be improved. In this case, the pH of the synthetic emulsion is preferably adjusted to 5 to 9. Then, as examples of a pH adjustor, basic substances such as ammonia, ethylamine, diethylamine, triethylamine, ethanolamine, triethanolamine, dimethylethanolamine, caustic soda and, caustic potash.

(B) Polyphosphate Salt

In the present invention, examples of a polyphosphate salt of the component (B) are ammonium polyphosphate, melamine polyphosphate and amide polyphosphate. Ammonium polyphosphate is preferable in the present invention. Ammonium polyphosphate is excellent in flame retardant performance and does not contain halogen atoms, which is considered to have a problem of harmfulness to a human body and natural environments, and is excellent, from the viewpoint of lowering toxicity of gas caused during burning as well as corrosiveness and smoke emission.

In the present invention, ammonium polyphosphate is a compound represented by a general formula $(NH_3)_{n+2}P_nO_{3n+1}$ [wherein, n is an integer of at least 2], and typically, a compound in which n is approximately at least 4.

In the case where ammonium polyphosphate is powdery, ammonium polyphosphate is preferably fine powder having an average powder particle diameter of at most 30 µm, and more preferably at most 20 µm. Examples of such powdery ammonium polyphosphate available as a commercial product are Pekoflam TC 204 Powder (trade name) (available from Clariant Ltd.) (fine powdery ammonium polyphosphate having an average particle diameter of 8 µm), Pekoflam TC 203 Powder (trade name) (available from Clariant Ltd.) (fine powdery ammonium polyphosphate having an average particle diameter of approximately 10 µm (large particle shape) different in particle size from the above-mentioned TC 204), Sumiyahu P (available from Sumitomo Chemical Co., Ltd.), ANTIBLAZE MC, ANTIBLAZE LR4 (available from Rhodia Ltd.), Taiene S (available from Taihei Chemical Industrial., Ltd.) and AMGARDMC (available from Albright & Wilson Ltd.).

In the case where ammonium polyphosphate is available as an aqueous solution, ammonium polyphosphate in an aqueous solution is low molecular weight in which n is approximately 40 in the above-mentioned general formula. Examples of such an ammonium polyphosphate aqueous solution available as a commercial product are Pekoflam TC 151 Liquid (trade name) (available from Clariant Ltd.) (a low-molecular-weight (n is at least 20 in the above-mentioned general formula) aqueous solution (concentration of ammonium polyphosphate is 45%) of ammonium polyphosphate), Pekoflam PES conc. Liquid (trade name) (available from Clariant Ltd.) (aqueous solution of ammonium polyphosphate having 90% concentration) and Pekoflam OP Liquid (trade name) (available from Clariant Ltd.) (aqueous solution of ammonium polyphosphate having 55% concentration).

Preparation of Aqueous Resin Composition

An aqueous resin composition according to the present invention can be obtained by mixing and stirring a synthetic resin emulsion of the component (A) and a polyphosphate salt of the component (B). For example, the process of mixing and stirring can be performed by while stirring the synthetic resin emulsion by using a common stirrer and gradually adding the polyphosphate salt thereto.

Therefore, according to another embodiment of the present invention, a process for preparing an aqueous resin composition, comprising mixing a polyphosphate salt into a synthetic resin emulsion obtained by emulsion-polymerizing a radical-polymerizable unsaturated monomer by using a surfactant having at least one polymerizable unsaturated bond and stirring the mixture, is provided.

As for a compounding ratio of the component (A) and the component (B) in the aqueous resin composition according to the present invention, a polyphosphate salt of the component (B) is preferably 5 to 300 parts by weight based on 100 parts by weight of a synthetic resin emulsion of the component of (A) calculated in terms of solid content. Having at least 5 parts by weight of the component (B) is desirable in order that the resin composition of the present invention performs sufficient flame retardancy. Having at most 300 parts by weight of the component (B) is desirable from the viewpoint that the resin composition of the present invention may perform so sufficient durability as abrasion resistance.

According to a more preferable embodiment of the present invention, as for the compounding ratio of the component (A) and the component (B) in the aqueous resin composition, a polyphosphate salt of the component (B) is 5 to 300 parts by weight based on 100 parts by weight of a synthetic resin emulsion of the component of (A) calculated in terms of solid content.

The aqueous resin composition according to the present invention may further contain additives such as a filler, a plasticizer, a pigment, a lubricant, a coloring agent, a thickener, a surfactant, an antifoaming agent, an antistatic agent, an ultraviolet absorber, a deodorant, and an aromatic agent, if necessary. In compounding these additives into the aqueous resin composition, a blend previously compounding these additives (such as a pigment paste) may be separately prepared and then mixed with the synthetic resin emulsion.

The aqueous resin composition according to the present invention can appropriately be preferably used for compositions and materials in various fields, which are required to be flame retardant, such as textile processing of backing materials or the like, adhesive agents, and coating agents.

Therefore, the flame retardant composition according to the present invention comprises the aqueous resin composition according to the present invention.

According to a further embodiment of the present invention, a process for flame-retarding a resin composition comprising compounding a flame retardant composition according to the present invention to a precursor composition of the resin composition is provided.

Herein, the resin composition is referred to a resin composition to which flame retardant performance is intended to be imparted, specifically, referred to a resin composition used as a backing agent, an adhesive agent, or a coating agent. The precursor composition thereof is referred to a precursor composition already having the composition of the desired resin composition, except that a flame retardant composition is not added thereto.

Therefore, according to another embodiment of the present invention, a backing agent composition, an adhesive agent composition, a binder composition and a coating agent composition comprising the aqueous resin composition according to the present invention are provided.

According to further another embodiment of the present invention, the use of the aqueous resin composition according to the present invention in order to impart flame retardancy to the backing agent, the adhesive agent or the coating agent is provided.

EXAMPLES

Examples of the present invention are explained in detail in the following, however, the present invention is not limited to thereto.

Example of Synthesis

Preparation of Synthetic Resin Emulsion

Emulsion 1

A polymerization reaction vessel was charged with 3 parts by weight of ammonium=α-sulfonate-ω-1-(allyloxymethyl) alkyloxypolyoxyethylene (polymerizable surfactant 1), 0.5 part by weight of a polyoxyethylenealkyl ether (non-polymerizable surfactant 2) and 95 parts by weight of water, and was heated up to an internal temperature of 80° C. Then, 10% by weight (10.25 parts by weight) of the total amount of a monomer mixture comprising the following composition and 1.0 part by weight of a 10% by weight-ammonium persulfate aqueous solution were added thereto. The internal temperature was kept at 80° C., and a kick-off reaction was carried out.

| Monomer mixture: | |
|---|---|
| methyl methacrylate | 30 parts by weight |
| butyl acrylate | 40 parts by weight |
| 2-ethylhexyl acrylate | 30 parts by weight |
| 80% by weight-acrylic acid aqueous solution | 2.5 parts by weight |

30 minutes after initiating the kick-off reaction, residual 90% by weight of the total amount of the monomer mixture and 4.0 parts by weight of a 10% by weight-potassium persulfate aqueous solution were fed thereto over 4 hours, and reaction materials were post-heated for 1 hour after terminating the feeding to complete the reaction of emulsion polymerization. The internal temperature was cooled to a room temperature and then adjusted to weak alkali in pH by using 3.8 parts by weight of 10%-ammonia water to obtain a synthetic resin emulsion (emulsion 1). A solid content in this emulsion 1 was 50.0%.

Emulsions 2 to 19

Emulsions 2 to 19 having a solid content of 50 to 51% were obtained in the same manner as the case of the above-mentioned emulsion 1 except that kinds and amounts of used monomers and surfactants were shown in Table 1.

Emulsions 16 to 19 are emulsions obtained by polymerizing without using surfactants, corresponding to Comparative Examples.

TABLE 1

| | Emulsion | | | | | | | | | |
|---|---|---|---|---|---|---|---|---|---|---|
| | 1 | 2 | 3 | 4 | 5 | 6 | 7 | 8 | 9 | 10 |
| Monomer | | | | | | | | | | |
| Methyl methacrylate | 30 | 50 | 15 | 15 | 0 | 15 | 15 | 15 | 15 | 50 |
| Acrylonitrile | 0 | 0 | 10 | 10 | 10 | 10 | 10 | 10 | 10 | 0 |
| Ethyl acrylate | 0 | 0 | 0 | 0 | 40 | 0 | 0 | 0 | 0 | 0 |
| Butyl acrylate | 40 | 50 | 75 | 75 | 50 | 75 | 75 | 75 | 75 | 50 |
| 2-ethylhexyl acrylate | 30 | 0 | 0 | 0 | 0 | 0 | 0 | 0 | 0 | 0 |
| 80% acrylic acid | 2.5 | 0 | 0 | 0 | 3.5 | 0 | 0 | 0 | 0 | 0 |
| Methacrylic acid | 0 | 2 | 2.5 | 2.5 | 0 | 2.5 | 2.5 | 2.5 | 2.5 | 2 |
| Itaconic acid | 0 | 0 | 0 | 0 | 0 | 0 | 0 | 0 | 0 | 0 |

TABLE 1-continued

| | | | | | | | | | | |
|---|---|---|---|---|---|---|---|---|---|---|
| Hydroxy ethylmethacrylate | 0 | 0 | 1 | 1 | 1 | 1 | 1 | 1 | 1 | 0 |
| Vinyltriethoxysilane | 0 | 0.5 | 0 | 0 | 2 | 1 | 0 | 0 | 0 | 0 |
| Acrylamide | 0 | 0 | 0 | 0 | 0 | 0 | 1 | 3 | 0 | 1 |
| Methacrylamide | 0 | 0 | 0 | 0 | 0 | 0 | 0 | 0 | 3 | 0 |
| Glycidyl methacrylate | 0 | 0 | 0 | 0 | 0 | 0 | 0 | 0 | 0 | 0 |
| Components charged into polymerization vessel | | | | | | | | | | |
| Polymerizable surfactant 1 | 3 | 6 | 0 | 3 | 0 | 0 | 4 | 0 | 6 | 6 |
| Polymerizable surfactant 2 | 0 | 0 | 3 | 0 | 4 | 0 | 0 | 3 | 0 | 0 |
| Polymerizable surfactant 3 | 0 | 0 | 0 | 0 | 0 | 8 | 0 | 0 | 0 | 0 |
| Non-polymerizable surfactant 1 | 0 | 0 | 0 | 0 | 0 | 0 | 0 | 0 | 0 | 0 |
| Non-polymerizable surfactant 2 | 0.5 | 0.5 | 0.75 | 0 | 0 | 0 | 0 | 0 | 0 | 0.5 |
| Non-polymerizable surfactant 3 | 0 | 0 | 0 | 0 | 0 | 0 | 0 | 0 | 0 | 0 |
| Water | 95 | 99 | 96 | 97 | 99 | 103 | 99 | 100 | 102 | 99 |
| Total | 201 | 208 | 203.25 | 203.5 | 209.5 | 215.5 | 207.5 | 209.5 | 214.5 | 208.5 |
| Solid content (%) | 50.0 | 50.2 | 50.4 | 50.2 | 50.1 | 50.4 | 50.0 | 50.1 | 50.2 | 50.2 |

| | Emulsion | | | | | | | | |
|---|---|---|---|---|---|---|---|---|---|
| | 11 | 12 | 13 | 14 | 15 | 16 | 17 | 18 | 19 |
| Monomer | | | | | | | | | |
| Methyl methacrylate | 0 | 30 | 15 | 15 | 15 | 30 | 15 | 15 | 0 |
| Acrylonitrile | 10 | 0 | 10 | 10 | 10 | 0 | 10 | 10 | 10 |
| Ethyl acrylate | 40 | 0 | 0 | 0 | 0 | 0 | 0 | 0 | 40 |
| Butyl acrylate | 50 | 40 | 75 | 75 | 75 | 40 | 75 | 75 | 50 |
| 2-ethylhexyl acrylate | 0 | 30 | 0 | 0 | 0 | 30 | 0 | 0 | 0 |
| 80% acrylic acid | 3.5 | 2.5 | 0 | 0 | 0 | 2.5 | 0 | 0 | 3.5 |
| Methacrylic acid | 0 | 0 | 2.5 | 2.5 | 0 | 0 | 2.5 | 2.5 | 0 |
| Itaconic acid | 0 | 0 | 0 | 0 | 2 | 0 | 0 | 0 | 0 |
| Hydroxy ethylmethacrylate | 1 | 0 | 1 | 1 | 1 | 0 | 1 | 1 | 1 |
| Vinyltriethoxysilane | 0 | 0 | 0.5 | 0 | 0 | 0 | 1 | 1 | 2 |
| Acrylamide | 3 | 5 | 0 | 0 | 0 | 0 | 0 | 0 | 0 |
| Methacrylamide | 0 | 0 | 3 | 0 | 0 | 0 | 0 | 0 | 0 |
| Glycidyl methacrylate | 0 | 0 | 0 | 2 | 0 | 0 | 0 | 0 | 0 |
| Components charged into polymerization vessel | | | | | | | | | |
| Polymerizable surfactant 1 | 0 | 3 | 0 | 0 | 2 | 0 | 0 | 0 | 0 |
| Polymerizable surfactant 2 | 4 | 0 | 0 | 0 | 0 | 0 | 0 | 0 | 0 |
| Polymerizable surfactant 3 | 0 | 0 | 8 | 6 | 4 | 0 | 0 | 0 | 0 |
| Non-polymerizable surfactant 1 | 0 | 0 | 0 | 0 | 0 | 3 | 5 | 5 | 8 |
| Non-polymerizable surfactant 2 | 0 | 0.5 | 0 | 0 | 0 | 0 | 1 | 1 | 0 |
| Non-polymerizable surfactant 3 | 0 | 0 | 0 | 3 | 0 | 0 | 0 | 0 | 0 |
| Water | 101 | 101 | 105 | 104 | 99 | 95 | 101 | 101 | 103 |
| Total | 212.5 | 212 | 220 | 218.5 | 208 | 200.5 | 211.5 | 211.5 | 217.5 |
| Solid content (%) | 50.0 | 50.0 | 50.2 | 50.3 | 50.1 | 50.0 | 50.1 | 50.0 | 50.2 |

In Table 1, non-polymerizable surfactants 1 to 3 and polymerizable surfactants 1 to 3 respectively indicate the following compounds:

Non-polymerizable surfactant 1: sodium dodecylbenzenesulfonate,

Non-polymerizable surfactant 2: polyoxyethylenealkyl ether,

Non-polymerizable surfactant 3: sodium polyoxyethylenealkyl ether sulfate,

Polymerizable surfactant 1: ammonium=α-sulfonate-ω-1-(allyloxymethyl)alkyloxypolyoxyethylene, Polymerizable surfactant 2: ammonium salt of α-sulfo-ω-(1-(alkoxy)methyl-2-(2-propenyloxy)ethoxy-poly(oxy-1,2-etha nediyl), and Polymerizable surfactant 3: polyoxyethylenealkylpropenylphenyl ether.

Preparation of Aqueous Resin Composition

Example 1

5 parts by weight of ammonium polyphosphate (ammonium polyphosphate A) and 0.1 part by weight of an antifoaming agent were added to 100 parts by weight (calculated in terms of solid content) of the emulsion 1 obtained in the example of synthesis while stirred by a mixer. A thickener (Mowinyl LDM 7010 (trade name), available from Nichigo-Movinyl Co., Ltd.) was added thereto and adjusted to 10000 to 20000 mPa·s in viscosity of the composition to obtain an aqueous resin composition.

Examples 2 to 15

Aqueous resin compositions of Examples 2 to 15 were obtained in the same manner as the case of the Example 1 except that kinds and amounts of used emulsions and ammonium polyphosphates were shown in Table 2, and that an antifoaming agent was added in an amount of 0 to 0.4 part by weight as required.

Examples 16 to 19

Comparative Examples

Aqueous resin compositions of Examples 16 to 19 were obtained in the same manner as the case of the Examples 2 to 15 except for using emulsions 16 to 19 as emulsions.

TABLE 2

| | Aqueous resin composition | | | | | | |
|---|---|---|---|---|---|---|---|
| | Ex. 1 | Ex. 2 | Ex. 3 | Ex. 4 | Ex. 5 | Ex. 6 | Ex. 7 |
| Emulsion | | | | | | | |
| Kind | Emulsion 1 | Emulsion 2 | Emulsion 3 | Emulsion 4 | Emulsion 5 | Emulsion 6 | Emulsion 7 |
| Amount | 100 | 100 | 100 | 100 | 100 | 100 | 100 |
| Ammonium polyphosphate A | 5 | 25 | 100 | 150 | 25 | | |
| Ammonium polyphosphate B | | | | | | 25 | 25 |
| Ammonium polyphosphate C | | | | | | | |
| Synthetic resin emulsion/ ammonium polyphosphate × 100 (calculated in terms of solid content) | 10.00 | 2.01 | 0.50 | 0.33 | 2.00 | 4.48 | 4.44 |

| | Aqueous resin composition | | | | | |
|---|---|---|---|---|---|---|
| | Ex. 8 | Ex. 9 | Ex. 10 | Ex. 11 | Ex. 12 | Ex. 13 |
| Emulsion | | | | | | |
| Kind | Emulsion 8 | Emulsion 9 | Emulsion 10 | Emulsion 11 | Emulsion 12 | Emulsion 13 |
| Amount | 100 | 100 | 100 | 100 | 100 | 100 |
| Ammonium polyphosphate A | | | 50 | 100 | | |
| Ammonium polyphosphate B | 50 | 50 | | | | |
| Ammonium polyphosphate C | | | | | 50 | 100 |
| Synthetic resin emulsion/ ammonium polyphosphate × 100 (calculated in terms of solid content) | 2.23 | 2.23 | 1.00 | 0.50 | 2.22 | 1.12 |

| | Aqueous resin composition | | | | | |
|---|---|---|---|---|---|---|
| | Ex. 14 | Ex. 15 | Com. Ex. 16 | Com. Ex. 17 | Com. Ex. 18 | Com. Ex. 19 |
| Emulsion | | | | | | |
| Kind | Emulsion 14 | Emulsion 15 | Emulsion 16 | Emulsion 17 | Emulsion 18 | Emulsion 19 |
| Amount used | 100 | 100 | 100 | 100 | 100 | 100 |
| Ammonium polyphosphate A | | | 5 | 5 | 25 | 25 |
| Ammonium polyphosphate B | | | | | | |
| Ammonium polyphosphate C | 25 | 50 | | | | |
| Synthetic resin emulsion/ ammonium polyphosphate × 100 (calculated in terms of solid content) | 2.01 | 1.00 | 10.00 | 10.02 | 2.00 | 2.01 |

In Table 2, ammonium polyphosphates A to C respectively indicate the following compounds:

Ammonium polyphosphate A: Pekoflam TC 204 Powder (trade name) (available from Clariant Ltd.) (fine powdery ammonium polyphosphate having an average particle diameter of 8 μm);

Ammonium polyphosphate B: Pekoflam TC 151 Liquid (trade name) (available from Clariant Ltd.) (aqueous solution of ammonium polyphosphate (herein, concentration of this aqueous solution is 45%) having a low molecular weight (n is at most 20 in the above-mentioned general formula);

Ammonium polyphosphate C: Pekoflam TC 203 Powder (trade name) (available from Clariant Ltd.) (fine powdery ammonium polyphosphate different in particle size from the above-mentioned TC 204 (large particle shape) (an average particle diameter of 10 μm))

In the following description, part by weight of ammonium polyphosphate B in an aqueous solution is a value calculated in terms of an aqueous solution.

positions of Examples 1 to 19 by using an applicator and then dried by an oven at a temperature of 150° C. for 1 minute. Respective obtained fabrics was cut into a fabric piece having a width of 5 cm and a length of 10 cm, which was regarded as a test piece. Each of the test pieces was placed in a glass bottle, which was covered with a glass plate and immersed in a water bath at a temperature of 80° C. for 20 hours. After the immersion, fog in the glass bottle was visually observed. The results of the visual observation were determined on the basis of the following criteria to evaluate fogging of respective compositions.

Criteria:
AA: no fog is observed
A: slight fog is observed
B: some fog is observed
C: significant fog is observed The results are shown in Table 3.

TABLE 3

| | Aqueous resin composition | | | | | | | | | |
|---|---|---|---|---|---|---|---|---|---|---|
| Evaluation | Ex. 1 | Ex. 2 | Ex. 3 | Ex. 4 | Ex. 5 | Ex. 6 | Ex. 7 | Ex. 8 | Ex. 9 | Ex. 10 |
| Stability | A | A | A | A | A | A | A | A | A | A |
| Fogging | A | A | A | AA | AA | A | AA | A | A | AA |

| | Aqueous resin composition | | | | | | | | |
|---|---|---|---|---|---|---|---|---|---|
| Evaluation | Ex. 11 | Ex. 12 | Ex. 13 | Ex. 14 | Ex. 15 | Com. Ex. 16 | Com. Ex. 17 | Com. Ex. 18 | Com. Ex. 19 |
| Stability | A | A | A | A | A | B | B | B | B |
| Fogging | AA | AA | A | A | AA | A | C | C | C |

EVALUATION TEST

Test 1

Stability Evaluation

The obtained aqueous resin compositions of Examples 1 to 19 were respectively placed in a glass bottle and preserved at a normal temperature of 20° C. for 2 weeks. As for each of the resin compositions, viscosity before and after preservation was measured to examine the change of viscosity due to preservation, and stability of the resin compositions was evaluated. The viscosity was measured by using a B-type viscometer. The evaluation of stability was determined on the basis of the following criteria by calculating ratio of viscosity before and after storage.

Criteria:
Viscosity after storage/viscosity before storage≦1.5: A (favorable)
Viscosity after storage/viscosity before storage>2: B (poor)

Test 2

Fogging Evaluation

A commercially available polyester fabric for an automobile interior was coated with each of the aqueous resin com-

The invention claimed is:

1. An aqueous resin composition comprising 100 parts by weight of a synthetic resin emulsion of a component (A) calculated in terms of a solid content and 5 to 300 parts by weight of a polyphosphate salt of a component (B), wherein:
   the component (A) is a synthetic resin emulsion prepared by emulsion-polymerizing a radical-polymerizable unsaturated monomer by using a surfactant having at least one polymerizable unsaturated bond; and
   the component (B) is a polyphosphate salt flame retardant free of resin encapsulation.

2. The aqueous resin composition of claim 1, wherein the polyphosphate salt of the component (B) is ammonium polyphosphate.

3. The aqueous resin composition of claim 1, wherein the radical-polymerizable unsaturated monomer in the component (A) is at least one selected from the group consisting of an alkyl (meth)acrylate ester, unsaturated carboxylic acid, a vinyl ester and an aromatic vinyl compound.

4. The aqueous resin composition of claim 1, wherein the radical-polymerizable unsaturated monomer in the component (A) further comprises a monomer having a crosslinkable functional group.

5. The aqueous resin composition of claim 1, which is flame retardant.

6. A process for preparing an aqueous resin composition of claim 1, comprising mixing a polyphosphate salt flame retardant free of resin encapsulation of component (B) into a synthetic resin emulsion of component (A) obtained by emulsion-polymerizing a radical-polymerizable unsaturated monomer by using a surfactant having at least one polymerizable unsaturated bond and stirring thereof.

7. The process of claim 6, wherein the polyphosphate salt is ammonium polyphosphate.

8. The process of claim 6, wherein the composition is flame retardant, and said process including compounding the flame retardant composition into a precursor composition to impart a flame retardant performance thereto.

9. The aqueous resin composition of claim 1, wherein the resin composition is selected from the group consisting of a backing agent, an adhesive agent, and a coating agent.

* * * * *